United States Patent [19]
Waterbury

[11] 3,752,904
[45] Aug. 14, 1973

[54] CREDIT AND OTHER SECURITY CARDS AND CARD UTILIZATION SYSTEM THEREFOR

[75] Inventor: Nelson J. Waterbury, Palm Beach, Fla.

[73] Assignees: Cynthia Cannon, London, England; Louis Beck, New York, N.Y. ; part interest to each

[22] Filed: Aug. 9, 1971

[21] Appl. No.: 169,906

[52] U.S. Cl.......... 178/5.1, 340/149 A, 235/61.7 B, 235/61.11 D, 235/61.12 M
[51] Int. Cl. .............................................. H04n 1/44
[58] Field of Search................ 340/149 A, 148, 152; 235/61.7 B, 61.11 D, 61.12 R, 61.12 C, 61.12 N, 61.12 M; 179/1 SB, 2 CA, 2 TV; 178/5.1

[56] References Cited
UNITED STATES PATENTS

| | | | |
|---|---|---|---|
| 3,639,905 | 2/1972 | Yaida et al. | 340/149 A |
| 3,569,619 | 3/1971 | Simjian | 340/149 A |
| 3,631,395 | 12/1971 | Zucker | 179/2 CA |
| 3,184,937 | 5/1965 | Sher | 179/1 SB |
| 2,849,542 | 8/1958 | MacChesney | 235/61.11 D |

Primary Examiner—Benjamin A. Borchelt
Assistant Examiner—S. C. Buczinski
Attorney—Kenyon & Kenyon Reilly Carr & Chapin

[57] ABSTRACT

A security card (which may be a credit card) according to the invention has recorded on it data identifying a personal and non-counterfeitable characteristic, such as a voice print, of the authorised holder of the card. Card utilisation systems according to the invention provide means for comparing the characteristic as recorded by this data with the corresponding characteristic of the person wishing to use the card, thereby substantially eliminating the possibility of unauthorised use of the card. The system, when applied to credit card utilisation, preferably includes document facsimile transmission, whereby a credit card user obtaining credit remotely can be provided with a facsimile copy of the usual credit sale document, which facsimile copy he signs before transmitting another facsimile copy, this time of the signed first copy, to provide the remote credit issuing location with his authentication of the transaction.

Preferably, also, the system includes provision for television communication between credit card holders and the credit-giving locations, whereby, for example, a remote would-be purchaser can be shown goods in which he is interested.

The system is also adapted to provide for credit card payment in, for example, pay television distribution systems and for remote purchase of theatre and airline tickets and of services such as the supply of information from computerised information systems and computerised translation services.

22 Claims, 8 Drawing Figures

Inventor
Nelson J. Waterbury

By
Attorneys

Patented Aug. 14, 1973

Inventor
Nelson J. Waterbury

By
Kenyon & Kenyon Reilly Carr & Chapin
Attorneys

Fig. 8

CREDIT AND OTHER SECURITY CARDS AND CARD UTILIZATION SYSTEM THEREFOR

This invention relates to credit and other security cards and to utilisation systems for such cards.

Objects of the invention include the provision of increased security against misuse of a credit or other security card according to the invention, such for example as a personal identity pass, and simultaneously, without sacrificing this increased security, widened facilities for authorised use of the card, including its use to authenticate the user's identity or to obtain credit at a location remote from that of the card holder, and even on a world-wide basis by making use of an existing or a specially provided international telecommunications network. Other objects and features of the invention will also become apparent from the following disclosure of the invention.

The basic feature of the invention is the provision of a security card which bears, as data identifying the authorised holder, data relating to characteristics or an attribute which are so personal to the holder that he, and only he, can use these characteristics or such personal attribute to generate, in a signal transmission system, signals which are transmissable by the transmission system to a remote location and which can then be compared with signals which are generated by means of the identifying data recorded on the card.

This and other features of the invention will be disclosed in the following description of embodiments of the invention, with reference to the accompanying drawings in which.

Figure 1:
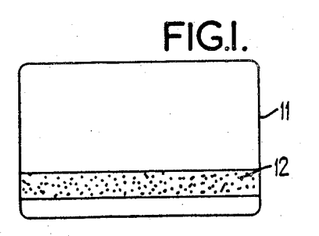
FIG. 1 illustrates a credit card which is of known type except that it bears a strip of magnetic recording material on which, though of course this cannot be illustrated, there is recorded a voice print of the authorised holder of the card.

The credit card illustrated in FIG. 1 and indicated generally by a reference 11 is of the well known kind, and may have printed or otherwise recorded thereon all the information concerning the issuing company, the authorised holder, and the credit limit to which use of the card is subject, which such cards customarily bear. Additionally, however, the card 11 is provided on one of its faces with a strip 12 of magnetic recording material on which is recorded a voice print of the authorised holder. The voice print may be recorded on the strip 12 directly as a sound recording of the voice of the authorised holder as he speaks, say, his name; or, equally satisfactorily, the voice print may be in the form of a magnetic record of a signal pulse train which constitutes a coded speech analysis of the speaking voice of the authorised holder as produced by means of a speech analyser prior to being recorded on the strip 12.

Figure 2:
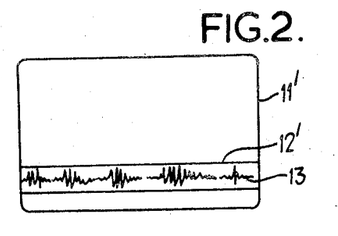
FIG. 2 illustrates a credit card which is similar to that shown in FIG. 1 except that, instead of a magnetic recording of the voice print of the authorised holder, it carries a visible representation of such a voice print.

The credit card illustrated in FIG. 2, and indicated generally by a reference 11', is also of the well known kind except that it is provided with a region 12' on which is visibly printed a trace 13 which is a visible record of a voice print of the authorised holder of the card. As in the case of FIG. 1, the card 11' of FIG. 2 might alternatively have visibly recorded on it not a voice print trace 13 as illustrated but a visible representation of spaced pulses constituting a coded speech analysis of the authorised holder of the card.

It will be understood that the cards 11 and 11', by means of the voice-print data recorded on them, each uniquely identify the authorised holder if they are presented to suitable apparatus for reading this data.

Figure 3:
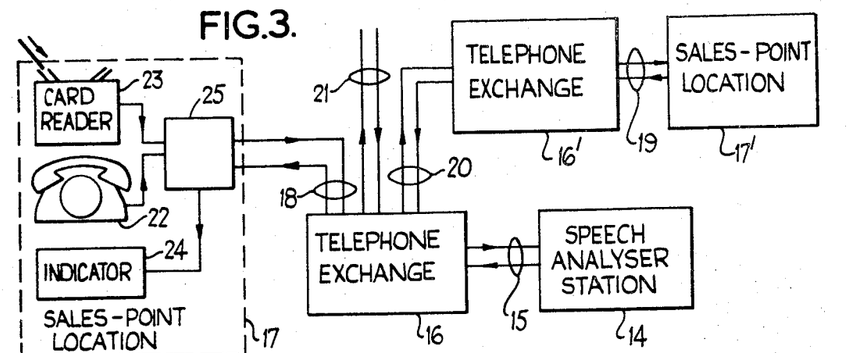
FIG. 3 is a schematic diagram of a credit card utilisation system with which a credit card as shown in FIG. 1 or FIG. 2 may be used.

FIG. 3 shows a first, basic, security card utilisation system with which credit cards or other security cards like the card 11 may be used. The system illustrated in FIG. 3 comprises a speech analyser station 14 connected via a public telephone line 15 to its local telephone exchange 16. The station 14 is accessible via the public telephone system to each of a plurality of salespoint locations of which two are shown, indicated by references 17 and 17' respectively. The sales-point location 17 is assumed to be in the same locality as the speech analyser 14 and to be served by the same telephone exchange 16, to which it is therefore connected by its own telephone line 18. The sales point location 17', identical in form with the location 17 and therefore not shown or described in detail, is assumed to be served by a telephone exchange 16' to which it is connected by a telephone line 19, the telephone exchanges 16 and 16' being connected to one another by a telephone line or other telecommunications link 20 as shown or (not shown) through intervening telephone exchanges. Further sales point locations (not shown) are connected, as by a further telephone line 21, to the exchange 16 and are thus each connectable to the speech analyser station 14.

Each sales-point location 17 or 17' and so on is one at which credit or other security cards like that shown in FIG. 1, say, are recognised; and each is provided with a telephone 22, a card reader 23 and an indicator 24, all connectable through connection circuitry 25 to the telephone line 18, as is illustrated schematically in the case of the location 17. A card holder wishing to use his card at, say, the location 17 uses the utilisation system shown in FIG. 3 as follows. First, he uses the telephone 22 to call the number of the speech analyser station 14, and by this means puts the location 17 in connection with the station 14, through the exchange 16. (If he were at location 17', the connection would be established through exchange 16' and 16). Having established the necessary connection, he speaks to the speech analyser station 14 which performs a speech analysis on the received speech. The card holder also presents his card 11 to the card reader 23, which is constructed to scan the strip 12 and derive therefrom signals representing the data recorded thereon. These signals are also transmitted to the speech analyser. If the data is directly in the form of recorded speech, the speech analyser station 14 performs a speech analysis on the reproduced recorded speech as well, and compares the results of the two analyses in any convenient manner. If, on the other hand, the voice print is recorded on the card in the form of pulses constituting a coded speech analysis, it will be arranged that the analyser station 14 provides a similarly coded analysis of the speech transmitted by the telephone 22 and then compares the two coded analyses. In either case, the analyser station makes the necessary comparison and then, dependent on the result being satisfactory, emits a signal which is transmitted back to the location 17 to actuate or illuminate the indicator 24 so as to confirm that the person presenting the card is the person whose voice print is recorded on it. The sales personnel at the sales-point location 17 can then, with full confidence, permit the card holder to use his card to obtain credit. It will be understood that although the locations 17 and 17' have been referred to as sales-point locations, this term is intended to include, for example, banks where the credit card holder will not be making a purchase but merely wishes to draw cash or effect some other transaction which he can only be permitted to do after having identified himself. Equally, the system might be an internal telephone system of, say, a security establishment or other organisation to which access is only permitted after proper idenfication. In that case, the telephone exchange 16 might be the internal exchange of the establishment (within which the speech analyser would be accommodated) and each entrance to the establishment, or to individual parts thereof, could be provided with an identity checkpoint (corresponding to the sales-point location 17) at which persons presenting themselves would present also not a credit card but a security card corresponding to the credit card as described above with reference to FIG. 1 or FIG. 2.

It is to be understood that although in the system illustrated in FIG. 3 the speech analyser station 14 is remote from all the sales-point locations and used by all of them in common, it would be within the scope of the invention to provide each sales-point location with its own analyser, the link to which would then not involve the public telephone system but only a private internal telephone system or, even, a direct connection provided for the credit card utilisation system alone.

It should also be understood that the data recorded on the credit or other security card of FIG. 1 or FIG. 2 for uniquely identifying the authorised holder need not, even assuming that voice prints are used for this purpose, be either a voice print itself or details of the analysis of the voice print. Instead, the data recorded on the card may be the access code to a specific location in a computerised memory store containing voice-print records or analyses of all authorised card holders, this memory store being associated with the speech analyser station 14 so that when, as above described, the data from a card 11 or 11' is read by a card reader 23 and transmitted to the station 14, the transmitted signals call up the respective memory store location and cause it to present the appropriate voice print or its analysis for comparison with the analysis performed by the speech analyser at station 14 on the voice of the card holder as transmitted from the telephone 22.

The systems described above with reference to FIG. 3 enable sales or security personnel at any of the locations 17 and so on to verify the identity of a card holder who is actually present at the respective location; and only minor modification or development of the system is required to enable a card holder to obtain credit or establish his identity on the same reliable basis without being present in person at the sales-point location, as, for example, when he wishes to order goods by telephone. However, it is preferred, when credit is to be obtainable remotely, to provide a more elaborate card utilisation system which not only serves to identify the card holder reliably but also gives him, in turn, the assurance that he will not be overcharged in respect of a purchase which he makes remotely by use of his credit card.

Figure 4:
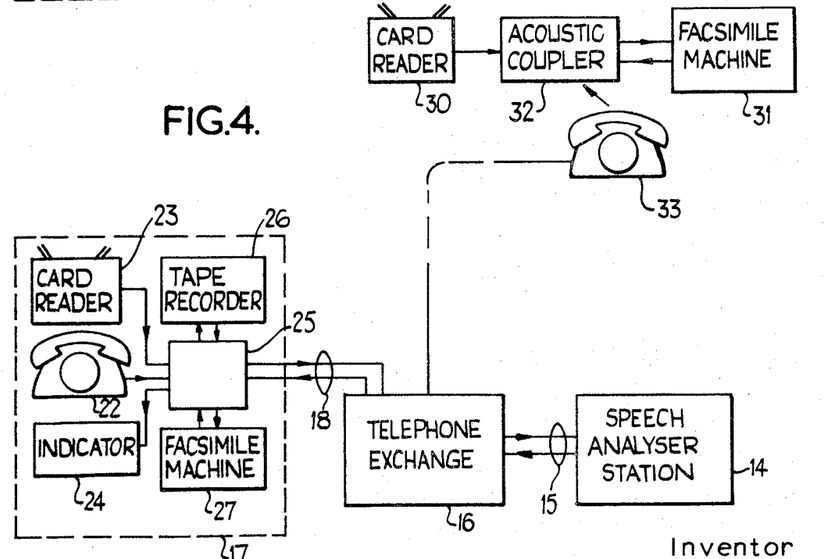
FIG. 4 is a schematic diagram of a more complex credit card utilisation system with which a credit card as shown in FIG. 1 or FIG. 2 may be used, in secure conditions, to transact business on credit between locations which are remote from one another.

A suitable system according to the invention is illustrated in FIG. 4. As in FIG. 3, it comprises a sales location point 17 furnished with a card reader 23 (for use in connection with card holders presenting themselves in person), a telephone 22 and an indicator 24, these all being connectable through connection circuitry 25 to the local telephone exchange 16 and therethrough to a speech analyser station 14 of the system. The location 17 of FIG. 4 is additionally furnished with a recording device 26 (which may be a suitable tape recorder) and with a document facsimile transmitter-receiver 27 of any known and suitable kind, thus being connected into theconnection circuitry 25.

Each credit card holder who wishes to be able to use his credit card remotely is provided with a card reader 30 and with a facsimile transmitter/receiver 31 (which may be identical in construction with, respectively, the card reader 23 and facsimile transmitter/receiver 27 at each sales point location 17), and also with an acoustic coupler device 32, of known kind, to which the card reader 30 and facsimile machine 31 are connected and by means of which they may be coupled to the credit card holder's telephone 33 (or indeed, to any telephone) and thus put in connection through an existing telephone system with any one of the sales-point locations 17.

The facsimile machine may be of any suitable kind, for example as disclosed in British Pat. No. 1169912 to Xerox Corporation. Similarly, the acoustic coupler 31 may be of any suitable kind, including that disclosed in British Pat. No. 1232734 to The Magnavox Company.

To make and pay for a purchase from a remote sales-point location 17, the card holder first uses his telephone 33 to make a call in the normal way to the appropriate sales-point location 17. This enables him to hold a normal telephone conversation with the sales personnel there, using the telephone 22. When a purchase has been agreed on, and the card holder advises that he wishes to use his card to make payment, the sales-point personnel first ascertains the caller's telephone number and then switches the circuitry 25 to connect the recorder 26 in circuit. The card holder then uses his telephone 33 to provide a sample of his speech which is recorded in the recorder 26, and then positions the handset of his telephone on the acoustic coupler 31 to connect his card reader 30 to the recorder 26. The card holder passes his credit card 11 through the card reader 30 and thus the data on the card is transmitted to the recorder 26 where it is recorded. The call originated by the card holder is then terminated, thus clearing the telephone line 18 connecting the sales-point location 17 to its local telephone exchange 16 and enabling the sales-point personnel to put through a normal telephone call to the speech analyser station 14. When this connection is established, the sales-point personnel plays back the recording on the recorder 26, thus presenting to the station 14 both the card holder's speech sample and the data recorded on his credit card. As already explained, this data may be an actual voice print, or a coded analysis of a voice print, or an access code which serves to retrieve either of these from a store or bank associated with the station 14. Whichever of these posssibilities is employed in the system, the signals transmitted to the station 14 enable the required comparison to be made there so that the station 14 transmits the appropriate signal to the indicator 24 at the location 17, indicating (if such is the case) that the card holder who made the original call is indeed the authorised holder of the card which he then presented to his card reader.

Having obtained this authentication, the sales-point personnel telephone the card holder's number, as previously ascertained, and thus re-establishes contact. He makes out the credit-card company's slip for the sale in the normal manner, as though the card holder were there in person to sign it, and then presents the completed slip to the facsimile machine 27 for transmission to the card holder's facsimile machine 31. The necessary interconnection of the two machines is achieved by the card holder replacing his telephone handset on the acoustic coupler 31 and the sales-point personnel setting his connecting circuitry 25 appropriately. Thus the machine 31 is caused to deliver to the card holder a facsimile of the slip which the sales-point personnel has completed. The card holder then immediately signs the facsimile he has received, and presents it (preferably with his credit card superimposed on a part of the slip left blank for the purpose) to the reader section of his machine 31, which causes the machine 27 at the sales-point location 17 to produce a further facsimile, this time of the signed slip. This further facsimile, bearing a facsimile of the card holder's signature (and preferably also of his credit card) may then be attached to the original (but unsigned) slip which was first completed, and the two documents together may be presented in the usual way to the card-issuing company, as debit notes against the account of the card holder.

In the foregoing description, the credit card utilisation systems disclosed by way of example have, for simplicity, been described as making use of independently existing telephone services as the necessary telecommunications links of the system. It will be apparent, however, that the way in which these links are provided is not basic to the invention. Clearly, the use of available existing services is preferable on grounds of cost and convenience if these are adequate for the demands of the system, but conceivably a credit card utilisation system according to the invention could be entirely self-contained, utilising its own private telecommunications links entirely, these being effected for example either by land lines or by short-wave radio or by a combination of these and possibly other means, not excluding long-distance linkages via earth satellite. If the linkages used in the system are of sufficiently high grade, it may be preferred to provide each sales-point location with television camera and transmission facilitities and to make television receiving facilities available perhaps optionally, to credit card holders. Then, a card holder wishing to order goods from a remote location, as described with reference to FIG. 4, can be shown, over the television link, those goods which he may wish to purchase. If he wishes to take time to consider his choice, of course, it is also possible for permanent pictures of the various goods available to be transmitted to him using the facsimile machine 27 at the sales-point location and his own facsimile machine 31.

Figure 5:
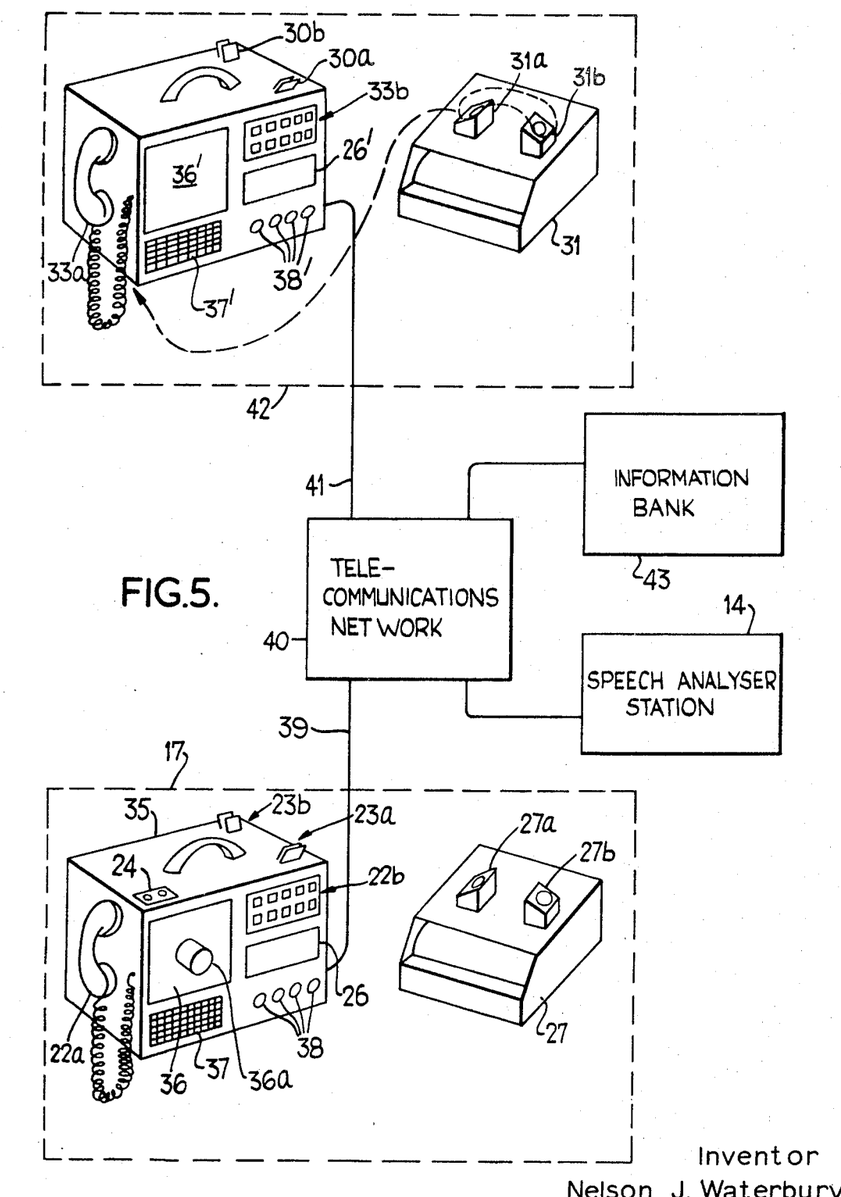
FIG. 5 schematically illustrates a further embodiment of a security card utilisation system according to the invention.

An embodiment of a card utilisation system which includes television facilities is illustrated in FIG. 5. As shown, a sales-point location 17 is provided with an integrally built telecommunication unit 35 which comprises: a push button telephone unit of which the handset is referenced 22a and the push-button unit 22b, with 10 buttons for the digits 0 – 9; a card reader of which card entry and exit slots 23a and 23b are shown; a tape recorder 26, a television camera 36 with lens 36a; a loudspeaker 37, an indicator unit 24 corresponding to the indicator unit 24 in FIG. 4; manual controls 38; and internal connection circuitry (not shown) which connects all the aforementioned to a transmission channel or channels 39 linking the unit 35 into a telecommunications network 40 which may be any suitable existing or specially provided network and is not further described here. Thus the unit 35 includes a television camera and in addition, all the items of equipment of the station 17 of FIG. 4 except the facsimile machine 27 thereof. In the FIG. 5 embodiment, the facsimile machine 27 for the location 17 is provided as a separate unit, with its own integral acoustic coupler of which parts 27a and 27b are provided to receive the telephone handset 22a, thereby to couple the facsimile machine 27 into the circuitry of the unit 35.

Also linked to the network 40, by its own transmission channel or channels 41, is a card-holder's station 42 which is provided with a unit 35' which may be, to a large degree, identical with the unit 35. It includes a telephone comprising a handset 33a and push-button unit 33b, a card reader with card entry and exit slots 30a and 30b, a television receiver with a screen 31b replacing the television camera 36 of the unit 35, a loudspeaker 37', manual controls 38 and a tape recorder 26'. As at the location 17, a facsimile machine 31 is provided separately, with integral acoustic coupler of which parts 31a and 31b co-operate with the telephone handset 33a (which may be placed upon them as shown in broken line) to couple the facsimile machine 31 into the circuitry of the unit 35'.

Each of many card-holder's stations, like the illustrated station 42, has access at will, through the network 40, to each of many sales point locations like the illustrated location 17, and each of these sales point locations also has access through the network 40 to the speech analyser station 14 which may also, as already described, include a memory store from which voice prints can be called up in response to signals read from card holders cards.

With sophisticated apparatus as above described, available at the stations 42, the card holder who has access to them may use his station not only for ordinary telephone use and for credit-sale transactions as above described, but also to gain access to, and to receive information from, any information banks, such as a bank 43, and other services which may be accessible via the network 40. The illustrated bank 43 may, for example, be a computerised microfilm library with selection and read-out means, capable of supplying requested information in a form adapted for presentation either on the television screen 36' of the station 42 or on the facsimile machine 31 thereof. It will be understood that, with the fully integrated system described, payment for such information may be made by use of the card holder's credit card. Similarly, access may be had to any available computerised translation service and, again, payment may be made by use of the holder's credit card.

A particular case in which use may or may not be made of a separately existing telephone service is in connection with a pay television network. In that case, of course, each television receiver in the network is usually connected by private land-lines to the central programme transmitting station; and these land-line connections may provide the means by which credit transactions of the kind already described are made by way of payment for programmes to be supplied. Each subscriber may have a telephone and a card reader, like the telephone 33 and card reader 30 of FIG. 4, these being connected or connectable to the transmitting station over the land line which is provided for carrying the programmes to his television receiver. He may then order a desired programme, and provide a sample of his speech by telephone, and then transmit his voice print by presenting his credit card to his card reader. With the order for a programme thus authenticated, the desired programme may be switched to his receiver and charged against his credit. The credit card may, similarly, be used for payment for use of a dial-a-song service, or for gaining access to movie programmes.

The foregoing descriptions of particular instances of ways in which credit-card utilisation systems according to the invention may be used are, of course, given by way of example only. Particularly in the case of a sophisticated system which provides for television communication and the transmission of facsimile copies, the uses to which the system may be put are almost limitless. In particular, as illustrated by the above description of a process of making a remote purchase, the parties involved may, even though remote from one another, deal with one another in complete security and in the knowledge that each can be supplied with full authentication of the transaction involved. It will be apparent that this advantageous characteristic of the credit cards and card utilisation systems according to the invention makes them ideal for financial transactions such as the issue and acknowledgement of instructions to banks or brokers. The provision of facsimile transmission not only enables payment to be authenticated as above described but also, when the purchase involves issue of a ticket or other document for subsequent use by the purchaser (as, for example, theatre and airline tickets, or cheques guaranteed by the issuing bank), enables the purchaser to be supplied with such documents without delay. In principle, of course, the facsimile apparatus may provide copies either in black and white or in full colour; and the same is true of the above described television facility. The use of cards and systems according to the invention as means of establishing or authenticating personal identities has already been referred to, and provides another example of an application of the invention.

It will be understood that, although the television facility provided in the system shown in FIG. 5 is a one-way facility only, the system illustrated could be modified if desired to provide two-way television communication. Thus, the camera 36 of each unit 35 could be replaced by a television receiver like that of each of the units 35', and each unit 35 and 35' provided additionally with a television camera, either built-in or separate but electrically connected to the unit. The system would then provide full two-way video-telephone facilities, in addition to the facilities already described.

If, as mentioned above, a card holder's station 42, includes a television camera facility, this can, of course, be used to transmit to any location 17, for presentation by the television receiver there on the screen thereof, a picture of the card holder and, simultaneously, of the card he holds. Particularly in this case, the card may be one which bears a photograph of the authorised holder, thus providing an immediate visual check as an additional security measure.

Figure 8:
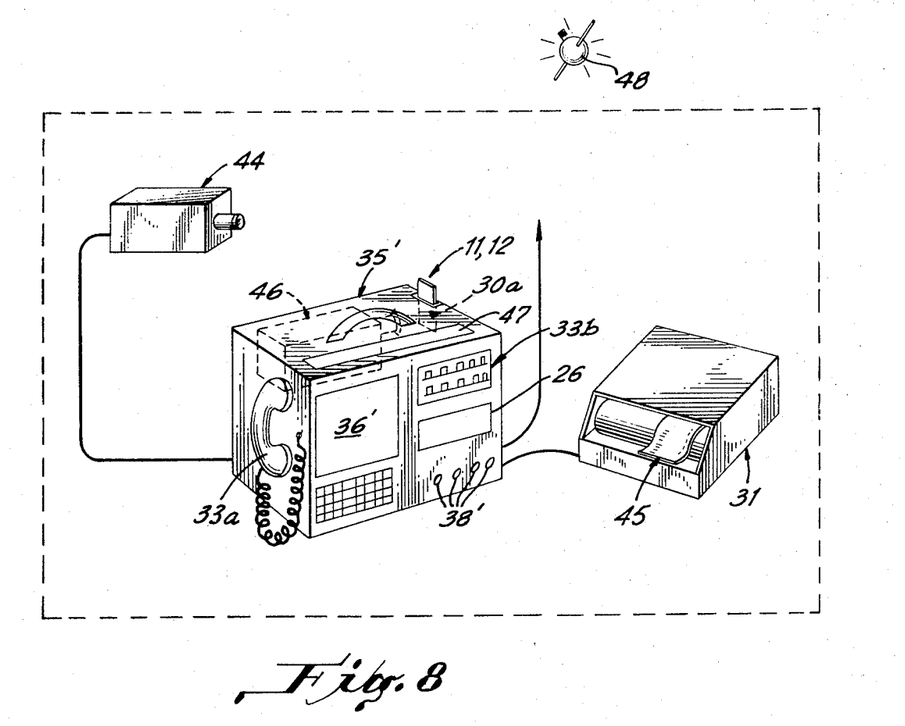
FIG. 8 schematically illustrates a portable station according to the invention.

It will be appreciated that each card holder's station 42, comprising the unit 35' and the facsimile machine 31, is conceived as a portable station which the card holder can carry with him. Each unit 35' may incorporate an acoustic coupler of its own, so that it may be easily connected to any convenient existing telephone. Equally, a unit 35'as shown in FIG. 8, may incorporate or be connectable to its own radio transmitter-receiver 46 so that it may be used from remote locations to which no wired telephone system extends. In that case, it is preferred that the unit 35' should include its own power generator, and this (in view of recent developments in the design and power capabilities of solar cells) may be constituted by a panel 47 of solar cells disposed, for example, on the top surface of the unit 35'. The radio transmitter-receiver can be linked via earth satellite 48 or a terrestrial radio link, as above, to a central location (not shown) as described above.

Finally, mention should be made of one further specific use of the card utilisation systems described in the foregoing, namely to enable telephone calls (including video-telephone calls if the system includes television facilities) to be paid for by means of the credit card. Thus, for example, in the system shown in FIG. 4, the telephone exchange 16 may itself include a sales-point location 17 at which the telephone operator can obtain authentication of a card holder's identity and details of his account, as recorded with his voice-print on his card, so that the call which the card holder requires can be charged to the correct account with no possibility that the use of the card was fraudulent.

Figure 6:
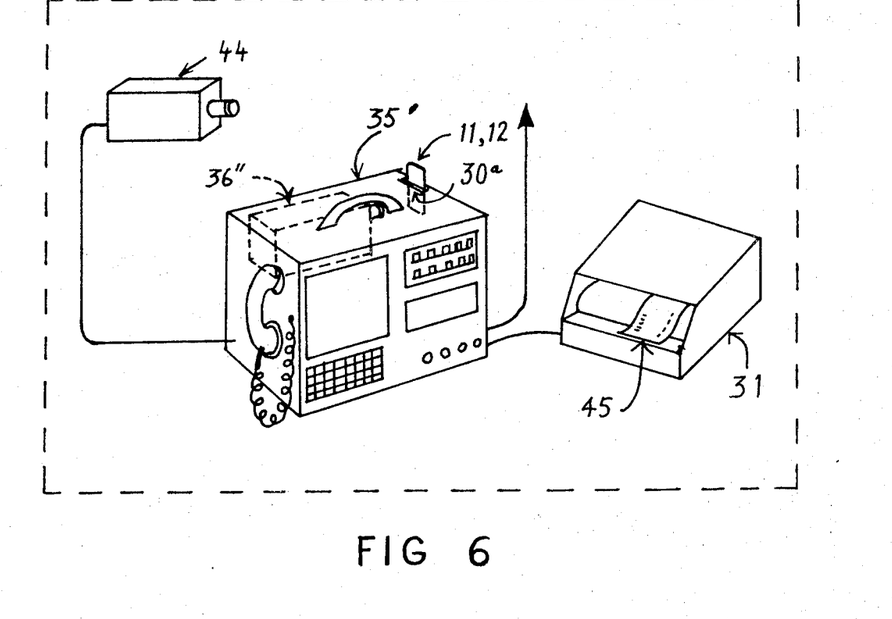
FIGS. 6 and 7 show further modifications.
Figure 7:
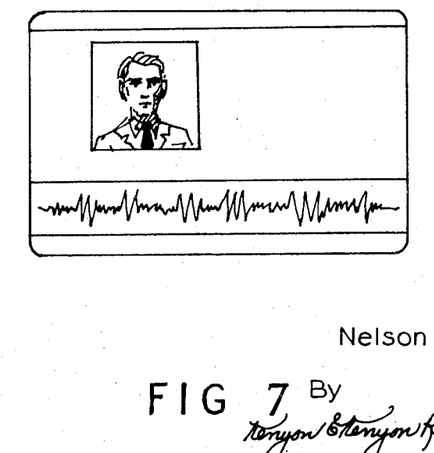

In the modification shown in FIG. 6, the unit 35' at the card holder's station 42 has linked to it a television camera 44 so as to provide for two-way television as referred to above (it being assumed that the camera 36 of unit 35 in FIG. 5 is replaced by a television receiver and that the unit 35 is similarly provided with a seaprate but linked camera like the camera 44). Additionally, the unit 35' includes a built-in camera 36" for the purpose of scanning and transmitting a picture of a credit card inserted into the unit 35'. To that end, the unit 35' in FIG. 6 has a differently oriented path for the inserted credit card. As shown, the entry slot 30a is so oriented that the inserted card is presented face-on to the camera 36". The exit slot for the card is not shown because it is on the unseen end of the unit 35' which is opposite to the end on which the handset 33a is provided. With this arrangement, a picture of an inserted credit card 11 or 12, like that of FIG. 1 or 2 but also bearing a picture of the authorised holder as shown in FIG. 7, can be transmitted to any location 17 which has been called by means of the telephone 33a, 33b. The location 17 thus called may, for example, be a bank from which the calling card holder desires a guaranteed bank cheque for a specified amount. The caller having called the bank and established his identity by means of his card, both visually and by means of the voice print record on it, the bank can issue the desired cheque by means of its facsimile machine, so that a facsimile guaranteed cheque 45 for the required amount is caused to issue, and thus be available for his use, from the card holder's facsimile machine 31 as shown. 45 forthe required amount is caused to issue, and thus be available fohis use,from the card holder's-facsimile machine 31sshown.

It will be appreciated that the authorised holder of a credit card as described with reference to FIG. 1, 2 or 7 may use it to have telephone calls charged to his own credit account whenever he makes a call from a telephone provided with means for reading either the voice print and/or the picture on his card, whether this telephone is a public telephone or the telephone of a private subscriber.

What is claimed is:

1. A security card having recorded thereon data in the form of a voice print which uniquely identifies the authorized holder of the card, said data relating to at least one personal and uncounterfeitable attribute of the said holder and being recorded on said card in a form which permits it to be read by suitable transducer means and converted thereby into electrical signals.

2. A security card as claimed in claim 1, wherein the voice print is recorded as a sound recording of the speaking voice of the authorised holder.

3. A security card as claimed in claim 1, wherein the voice print is recorded as a signal-pulse train constituting a coded speech analysis of the speaking voice of the authorized holder.

4. A security card as claimed in claim 1 and formed at least in part as a magnetic recording layer having the said data magnetically recorded thereon.

5. A security card as claimed in claim 1 and having the said data visibly recorded thereon and thereby readable by suitable optical screening means.

6. A security card utilisation system comprising a plurality of security cards each as claimed in claim 1 and each having a voice pring recorded thereon which uniquely identifies a respective authorised card holder, at least one first transducer adapted to read said data of any one of said cards presented to it and to produce first electrical signals which contain said data, at least one second transducer means responsive to the said personal attribute of any person and operative to produce second electrical signals representative of that personal attribute of such person, and at least one comparator connectable to the first transducer and to the second transducer to receive the said first and the said second electrical signals therefrom and operative to effect a comparison of the personal attribute to which said data relates and of the said personal attribute as represneted by said second signals, and to provide an indication, on the basis of the said comparison, whether or not the said person is the authorised holder of the said one card.

7. A security card utilisation system as claimed in claim 6, wherein the said second transducer includes a microphone responsive to speech of the said person, and wherein the said comparator includes a speech analyser.

8. A security card utilisation system as claimed in claim 6, wherein a respective first transducer and a respective second transducer are provided in pairs at each of a plurality of locations and the first transducer and second transducer at each of said locations are connectable via a telecommunications link to a common comparator serving a plurality of said locations.

9. A security card utilisation system as claimed in claim 8, wherein the said telecommunication link between any of said locations and the comparator includes at least one of; a public telephone line, a private telephone line, a terrestrail radio link, an earth-satellite radio link.

10. A security card utilisation system as claimed in claim 8, wherein the comparator comprises a speech analyser, for analysing speech as transmitted by the said first and by the said second signals, and means for comparing the analysis results in the two cases.

11. A security card utilisation system as claimed in claim 8, wherein each of said locations is provided with means for receiving and temporarily storing signals corresponding to said first and said second signals and transmitted from any one of a plurality of remote stations each provided with a first remote transducer and with a second remote transducer, said first and second remote transducers being similar to the said first and said second transducers at each said location and connectable to any of said locations by a telecommunications link.

12. A security card utilisation system as claimed in claim 11, wherein each of the said locations and each of the said remote stations is further provided with a facsimile reader and receiver capable of transmitting and reproducing copies of the said security cards and of documents relating to purchases made by the remote use of said security cards.

13. A security card utilisation system as claimed in claim 13, wherein each of said locations and at least some of said remote stations are further provided with television facilities.

14. A pay-television system comprising a programme transmitting station, a plurality of television-receiving locations each linked by a telecommunications link to said station for receiving programmes emitted thereby, card reading means at each receiving location for reading the data recorded on a security card as claimed in claim 1 and transmitting said voice print to the transmitting station, telephone means at each receiving location enabling a subscriber to call the transmitting station and order a programme and provide a sample of his speech, and means at the transmitting station for analysing such speech sample and comparing it with the said voice print.

15. A security card utilisation system as claimed in claim 11, wherein at least one of said locations is included in a telephone exchange of said telecommunications link and enables telephone calls made through said exchange from one of said remote stations to be charged to the credit account represented by a credit card presented at such remote station.

16. A security card utilisation system as claimed in claim 11, wherein at least one of said remote stations is provided with a radio transmitter-receiver constituting at least a part of said telecommunications link, and wherein said station includes solar cell devices and can be powered thereby.

17. A security card as claimed in claim 1 and further bearing a portrait photograph of the authorised holder.

18. A security card utilisation system as claimed in claim 13, wherein at least some of said remote stations are provided with a television camera by means of which an image of a portrait-bearing card can be transmitted to any of said locations.

19. A security card utilisation system as claimed in claim 18, wherein said television camera is housed within a unit provided with a slot for insertion of said card thereinto and into the camera field of view, said unit further including a television receiver, a telephone, card-data reading means, connection means for a facsimile machine, and connecting circuitry therefor.

20. A security card utilisation system as claimed in claim 7 and comprising a telephone network including a plurality of telephones, each of at least some of said telephones having associated therewith a respective said first transducer and including a microphone constituting a respective said second transducer, whereby a telephone caller, who is an authorised card holder, using any of those telephones may pay for his call by use of his card.

21. A security card utilisation system as claimed in claim 21, wherein the said telephone network includes a video-telephone.

22. A security card having recorded thereon data which uniquely identifies the authorized holder of the card, said data relating to at least one personal and uncounterfeitable attribute of the said holder and being recorded on said card in a form which permits it to be read by suitable transducer means and converted thereby into electrical signals, said data being the access code to a memory location in which is stored a voice print of the authorized holder of the card.

* * * * *

UNITED STATES PATENT OFFICE
CERTIFICATE OF CORRECTION

Patent No. 3,752,904          Dated August 14, 1973

Inventor(s)      NELSON J. WATERBURY

It is certified that error appears in the above-identified patent and that said Letters Patent are hereby corrected as shown below:

Column 6, line 34, "31b" should be --36b--.

Column 9, lines 7 to 9, delete "45...shown.".

Column 9, line 41, "pring" should be --print--.

Column 9, line 55, "represneted" should be --represented--.

Column 10, line 8, "terrestrail" should be --terrestrial--.

Signed and sealed this 17th day of September 1974.

(SEAL)
Attest:

McCOY M. GIBSON JR.          C. MARSHALL DANN
Attesting Officer          Commissioner of Patents